(12) United States Patent
Kessler

(10) Patent No.: US 8,531,750 B2
(45) Date of Patent: Sep. 10, 2013

(54) AFOCAL BEAM RELAY

(75) Inventor: David Kessler, Rochester, NY (US)

(73) Assignee: Kessler Optics & Photonics Solutions, Ltd., Rochester, NY (US)

( * ) Notice: Subject to any disclaimer, the term of this patent is extended or adjusted under 35 U.S.C. 154(b) by 0 days.

(21) Appl. No.: 13/586,965

(22) Filed: Aug. 16, 2012

(65) Prior Publication Data

US 2012/0307328 A1 Dec. 6, 2012

Related U.S. Application Data

(63) Continuation-in-part of application No. 12/611,320, filed on Nov. 3, 2009, now Pat. No. 8,274,720.

(60) Provisional application No. 61/152,709, filed on Feb. 15, 2009.

(51) Int. Cl.
*G02B 26/08* (2006.01)

(52) U.S. Cl.
USPC .............. 359/202.1; 359/201.1; 359/201.2; 359/729; 359/731; 359/859; 359/861

(58) Field of Classification Search
USPC .............. 359/201.1–202.1, 641, 729, 731, 359/858, 859, 861
See application file for complete search history.

(56) References Cited

U.S. PATENT DOCUMENTS

| | | | |
|---|---|---|---|
| 3,748,015 A | 7/1973 | Offner | |
| 4,097,125 A | 6/1978 | Suzuki | |
| 4,693,569 A | 9/1987 | Offner | |
| 4,798,450 A | 1/1989 | Suzuki | |
| 5,221,975 A | 6/1993 | Kessler | |
| 6,304,315 B2 | 10/2001 | Kessler et al. | |
| 2004/0246595 A1* | 12/2004 | Beach | 359/728 |
| 2006/0050258 A1* | 3/2006 | Hudyma et al. | 355/67 |

OTHER PUBLICATIONS

Smith, Warren J., Modern Optical Engineering, the Design of Optical Systems, McGraw-Hill, NY, 1966, pp. 124-125, 393-394.
G.C. deWit and J.J.M. Braat, "Offner-type pupil relay optics for a scanning system", Design and Engineering of Optical Systems, SPIE vol. 2774, pp. 553-561.

* cited by examiner

*Primary Examiner* — James Phan
(74) *Attorney, Agent, or Firm* — Louis S. Horvath

(57) ABSTRACT

An afocal beam relay has first and second primary concave reflective surfaces and first and second secondary convex toroidal reflective surfaces. The centers of curvature of each of the first and second primary reflective surfaces and first and second secondary reflective surfaces lie on an axis. The first and second secondary convex reflective surfaces face toward the first and second primary concave reflective surfaces and are disposed to relay a decentered entrance pupil to a decentered exit pupil. An aspheric corrector element is disposed in the path of an input beam of light that is directed by the primary and secondary surfaces to the decentered entrance pupil. The directed beam of light between the first and second secondary convex mirrors is collimated in one direction and focused in mid air in an orthogonal direction.

15 Claims, 14 Drawing Sheets

| Surface number | Surface Type | Radius of Curvature | Thickness | Glass | Aspheric term | diameter or size | off axis displacem | Bend angle |
|---|---|---|---|---|---|---|---|---|
| 0 | | | infinity | | | | | |
| 1 | Coordinate Break | | 2.000 | | | | 10 | |
| 2 | CORRECTOR | | 70.000 | SILICA | | 20 | | |
| 3 | Aspheric | | | | 2.66 E-007 | 20 | | |
| 4 | Coordinate Break | | -90.000 | | | | -10 | -45 |
| 5 | FOLD | | | MIRROR | | 48 x 24 | | |
| 6 | Coordinate Break | | 80.002 | | | | 10 | -45 |
| 7 | CONCAVE | 160.000 | | MIRROR | | 76 x 40 | | |
| 8 | CONVEX | 80.000 | -80.002 | MIRROR | | 32 x 3.2 | | |
| 9 | CONCAVE | 160.000 | 90.000 | MIRROR | | 76 x 40 | | |
| 10 | Coordinate Break | | | | | | 10 | -45 |
| 11 | FOLD | | -70.000 | MIRROR | | 48 x 24 | | |
| 12 | Coordinate Break | | | | | | | -45 |
| 13 | EXIT PUPIL | | | | | 16 | | |

FIG. 9

AFOCAL BEAM RELAY

CROSS REFERENCE TO RELATED APPLICATIONS

The present application is a Continuation-In-Part of U.S. patent application Ser. No. 12/611,320, filed on Nov. 3, 2009, entitled "CONCENTRIC AFOCAL BEAM RELAY", which, in turn, claims priority from U.S. Ser. No. 61/152,709, provisionally filed on Feb. 15, 2009, entitled "CONCENTRIC AFOCAL BEAM RELAY", in the name of David Kessler and incorporated herein by reference.

FIELD OF THE INVENTION

This invention generally relates to beam steering and scanning systems and more particularly relates to beam scanners that provide scanning in two orthogonal directions using an arrangement of reflective surfaces.

BACKGROUND OF THE INVENTION

Many types of laser scanners and printers use a one-dimensional (1-D) beam deflector such as a spinning polygon, monogon, hologon, or a reciprocating galvo mirror, that scans the beam along a line. To provide two-dimensional (2-D) scanning with a 1-D beam deflector requires that mechanical motion be provided for scanning in the other dimension, orthogonal to the first. This is commonly done by a transport system that moves the scanned media or moves the scanning deflector.

Two-dimensional beam deflectors provide a simpler solution for steering the light beam for scanning along two orthogonal directions or axes. With some scanning laser systems, this is often termed Two-Axis Beam Steering (TABS). TABS scanning can use an arrangement comprised of two galvo mirrors like the ones made by Cambridge Technology, Cambridge Mass.; GSI Lumonics (previously General Scanning Inc) Bedford Mass.; Nuffield Technology Inc., Windham N.H.; and GalvoScan LLC, South Royalton Vt. Similar Fast Scanning Mirrors (FSM) systems also steer the beam in two dimensions using reciprocating reflective surfaces. Galvo mirrors are commonly used as deflectors due to their relatively wide deflection angles and high scan speed, especially when used in the resonant mode. Because galvo scanners scan only in one direction, a pair of galvo mirrors in series is used as the deflection system to accomplish 2-D scanning.

Laser beam scanning systems are generally classified by the arrangement of the deflection system relative to the focusing lens. When deflection system components follow the focusing lens, the system is termed a post-objective system. When the focusing or scan lens follows the beam deflector, the system is called a pre-objective scanner. Post objective scanners are usually simpler in design compared with pre-objective scanners, but are generally more limited in terms of scan fields and are more prone to distortion and field curvature.

The schematic diagram of FIG. 1 shows how light is directed for 2-D scanning by components in a pre-objective scanning system 80. A light beam 82 of beam width B, preferably collimated, is deflected by a first galvo mirror 35 that scans relative to a first axis and toward a second galvo mirror 35A that scans relative to a second axis that is orthogonal to the first axis. A scan lens 120 then directs this 2-D scan to form a 2-D image 130.

Among disadvantages of the arrangement of FIG. 1, second mirror 35A must be large enough to accommodate the deflected beam from first mirror 35, and thus cannot operate at high speed. Another disadvantage relates to mirror positioning. With a pre-objective system, the beam deflector provides the best optical performance when it is positioned in an external entrance pupil of the scan lens. This is shown as pupil 30 in FIG. 1. However, for such a two-mirror system, this would require that both mirrors 35 and 35A be positioned at entrance pupil 30. As a compromise, galvo mirrors 35 and 35A are generally positioned close to, and equidistant from, pupil 30, displaced at a distance L as shown in FIG. 1. When this is done, because both mirrors 35 and 35A are displaced from entrance pupil 30, scan lens 120 must have an aperture large enough to accommodate the beam displacements. This adds cost and size, requiring that scan lens 120 have a higher effective numerical aperture than does a system that uses a single two-dimensional scan mirror.

With both mirrors displaced from the entrance pupil, the aperture diameter D of the aperture corresponding to entrance pupil 30 is given by:

$$D = B + 2 \cdot L \cdot \operatorname{Tan}(\alpha)$$

Where:
B is the beam diameter of light beam 82;
L is the distance from pupil 30, along the axis, of the farthest mirror galvo;
and α is the semi beam angle.

For example, with a beam diameter of 10 mm, a shift L of 20 mm, and a semi scan angle α of 15 degrees, the aperture D is 20.7 mm. Thus, the entrance pupil must be about twice the diameter of the beam. The numerical aperture (NA) of the scan lens 120 is therefore twice the NA of a scan lens where the mirror deflector is located at the entrance pupil 30.

As is shown in FIG. 2, one approach to solve this problem and reduce the NA of scan lens 120 is to optically co-locate galvo scanning mirrors 35 and 35A. There can be a number of ways to do this using refractive and reflective relay optics. Referring to the schematic diagram of FIG. 2, there is shown an example of an optical relay 90 that relays galvo mirror 35 onto galvo mirror 35A. In the arrangement of FIG. 2, the pupil relay uses two off-axis concave mirrors 55 and 56 to relay galvo mirror 35 onto galvo mirror 35A. With this type of solution, both deflectors can thus be optically positioned within the entrance pupil of scanning lens 120. This reduces the numerical aperture requirements for lens 120, as described earlier, and reduces the size requirements of the second galvo mirror 35A. Actuators 32 and 32A control the rotation of their respective scanning mirrors 35 and 35A.

In spite of its advantages for reducing size and performance requirements of other components in the optical system, however, the arrangement of optical relay 90 as shown in FIG. 2 has a number of problems that prevent its use in most laser scanner applications. Off-axis aberrations of the concave mirrors can seriously degrade the performance of such a system. Both mirrors are relatively large, requiring precision manufacture to minimize defects in maintaining exact curvatures. This solution is not particularly compact and does not scale well for large scan angles.

As exhibited in the example of FIG. 2, pupil relay optics show some promise for at least reducing some of the problems inherent to 2-D beam scanners using lasers. However, problems remain. In order for a pupil relay to satisfactorily serve 2-D beam scanning applications, the following basic set of requirements must be met:

(i) Low aberration. While some amount of aberration is inevitable, it is important that the pupil relay solution be well corrected and have minimal aberration.

(ii) Capable of handling large deflection angles. Angles of up to 12 degrees and larger should be accommodated.

(iii) Preserves the phase of the beam wavefront. When this requirement is met, a collimated input beam with a planar phase wavefront that enters the entrance pupil of the relay, on axis or at an angle within its specified field of view, exits from the exit pupil as a collimated beam, again with planar phase wavefront. The optical path difference (OPD) between any point at the entrance pupil and its conjugate point at the exit pupil is the same. This characteristic is of particular interest for laser scanning. The capability to preserve the phase of the beam wavefront distinguishes the performance requirements of a pupil relay system from the requirements of an imaging relay system. In an imaging relay system, beam wavefront and phase considerations are unimportant and the phase of the beam wavefront is not preserved.

(iv) Capable of providing a large pupil size, effectively forming an image of a circular pupil.

(v) Afocal. For beam relay applications, it is most preferable to handle collimated light. Exit and entrance pupils should be at infinity.

(vi) Color-corrected. This requirement depends on the application. Good color correction enables use of either monochromatic light or polychromatic light over a broad spectral range.

(vii) Low cost. This relates both to precision of assembly and number of components.

(viii) Reduced size.

However, as seen from the example of FIG. 2, pupil relay solutions proposed thus far fail to satisfy all of these requirements. Instead, conventional pupil relay solutions typically compromise on one or more of these basic requirements.

In a paper entitled "Offner-type pupil relay optics for a scanning system" by G. C. deWit and J. J. M. Braat, in Design and Engineering of Optical Systems, SPIE vol. 2774, pp. 553-561, three possible pupil relay solutions are compared, including a spherical mirror on-axis relay, a spherical mirror off-axis relay, and an Offner-type system. These researchers conclude that the spherical mirror on-axis solution is optically superior to the other two proposed solutions.

Significantly, researchers deWit and Braat were intrigued with some of the advantages of an Offner-type solution, but were unable to make this arrangement work satisfactorily as a pupil relay and found the Offner-type arrangement inferior to on-axis spherical mirror designs. The authors cite the advantages of Offner optics as they relate to size, optical properties, and unlimited horizontal field of view (FOV). However, the Offner arrangement does not provide a pupil relay and is, by itself, a poor solution for directing a 2-D scanning beam, chiefly because it fails to preserve the beam wavefront, a significant needed feature of a pupil relay as noted earlier in requirement (iii).

It is instructive to understand more clearly why the Offner optical system, disclosed in U.S. Pat. No. 3,748,015 entitled "Unit Power Imaging Catoptric Anastigmat" to Offner, does not function as a pupil relay. This shortcoming is most readily shown by a description of the Offner optical system itself. Referring to FIG. 3, an Offner optical system 92 is a one-to-one object-to-image relay system using two concentric mirrors, a primary concave mirror 50 and a secondary convex mirror 60. The system is afocal, with its entrance pupil at infinity. The aperture stop of this optical system, pupil 65, is at secondary convex mirror 60. This system is corrected for all third order aberrations and for a number of higher order aberrations.

The imaging function of Offner optics is constrained to image a specific field of a particular shape, rather than for a circular beam. The Offner optical system, as shown in the example of FIG. 3, is a member of a class of imaging systems that have an annular object, or a ring object 15 and, in turn, form a corresponding ring image 15A. Because of higher order aberrations, such as fifth order astigmatism, the object shape is limited to a thin arcuate region 15 about the optical axis OA. Thus, in practice, the Offner system is used to scan across a 2-D area and form an image of the arcuate object shown as object 15 in FIG. 3. Examples of how the Offner optics are used for scanning are given, for example in U.S. Pat. No. 5,221,975 entitled "High Resolution Scanner" to Kessler that describes a CCD scanner for film reproduction and in U.S. Pat. No. 6,304,315 entitled "High Speed High Resolution Continuous Optical Film Printer for Duplication Motion Films" to Kessler et al. As each of these patents shows, the object of the Offner optical system is an arc of limited thickness and the optical system faithfully images that arc with little aberration, effectively scanning a 2-D image over this arcuate image area.

In an attempt to improve the relative size of the arc that can be imaged by this two-mirror system, Suzuki in U.S. Pat. No. 4,097,125 adjusts the positions of the two curved mirrors so that they are no longer concentric, as is required in the conventional Offner system. Even with this change, however, the width of the relatively narrow slit imaged by the Offner system can only be increased by about a factor of 2. The modified arrangement provided by Suzuki '125 still images an arcuate object, not a circular beam, and would also fail as a pupil relay.

Another significant problem with Offner-type optics relates to the beam wavefront. When the Offner system is used as an object-to-image relay, the object points are incoherent with each other. This is not a concern for imaging, as was noted earlier. However, in order to maintain beam quality as a beam relay, the beam phase wavefront at the entrance pupil must be preserved at the exit pupil. This is not the case with Offner optics. When the Offner system is used as an object-to-image relay, five of the third-order aberrations, namely spherical, coma, astigmatism, Petzval, and distortion, are corrected. However, one of the third order aberrations, called "piston error" which particularly relates to the phase difference between different object points, is not corrected. In the type of imaging system for which the Offner optics are designed, there is no need to correct for the piston error since the object points are themselves generally incoherent with each other and phase is not important. However, for beam relay optics, such a phase difference is an aberration that severely degrades beam quality for a coherent beam and can render the optical system unusable. In summary, because it is an image relay system, and not a pupil relay system, as described in requirement (iii) above, the Offner system does not preserve phase relationships.

Thus, it can be appreciated by those skilled in the optical arts that the Offner system is an afocal imaging relay, not an afocal pupil relay, and it is no surprise that, in spite of their interest in some of the potential capabilities and compactness of Offner optics, researchers have been unable to adapt this arrangement for use as an acceptable pupil relay.

The need remains for pupil relay optics for 2-D scanning that meet requirements (i) to (viii) given earlier. In spite of some perceived advantages, however, solutions posed thus far have failed to take advantage of Offner-type optics for use as a beam relay for this purpose, due to inherent limitations of such systems.

SUMMARY OF THE INVENTION

It is an object of the present invention to advance the art of laser scanning systems. With this object in mind, the present invention provides an afocal beam relay comprising:

first and second primary concave reflective surfaces and first and second secondary convex toroidal reflective surfaces, wherein the centers of curvature of each of the first and second primary reflective surfaces and first and second secondary reflective surfaces lie on an axis;

wherein the first and second secondary convex reflective surfaces face toward the first and second primary concave reflective surfaces and are disposed to relay a decentered entrance pupil to a decentered exit pupil; and an aspheric corrector element that is disposed in the path of an input beam of light that is directed by the primary and secondary surfaces to the decentered entrance pupil, wherein the directed beam of light between the first and second secondary convex mirrors is collimated in one direction and focused in mid air in an orthogonal direction.

It is a feature of the present invention that it adapts an optical arrangement that is conventionally used for imaging or relaying an arcuate object field for use as a beam relay. The beam relay that is formed is capable of handling large deflection angles and large pupil sizes.

The present invention takes advantage of the reduced third-order aberrations of concentric reflective optical designs. It is also afocal and color corrected. As pupil relays, embodiments of the present invention preserve the phase of the beam wavefront.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 9 is a table giving example optical specifications for a beam relay in one embodiment.

DETAILED DESCRIPTION OF THE INVENTION

Figure 1:
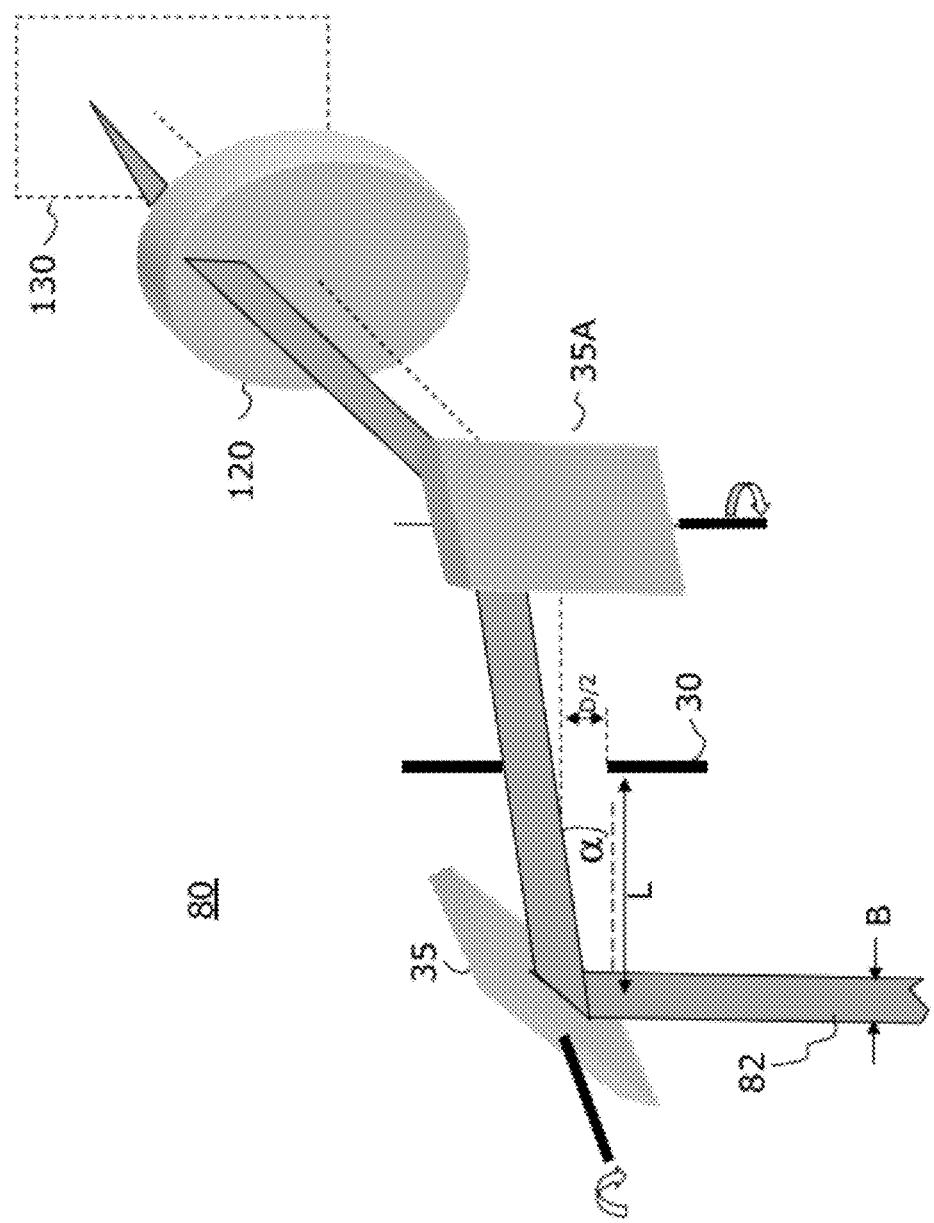
FIG. 1 is a schematic diagram of 2-D pre-objective scanning optics.
Figure 2:
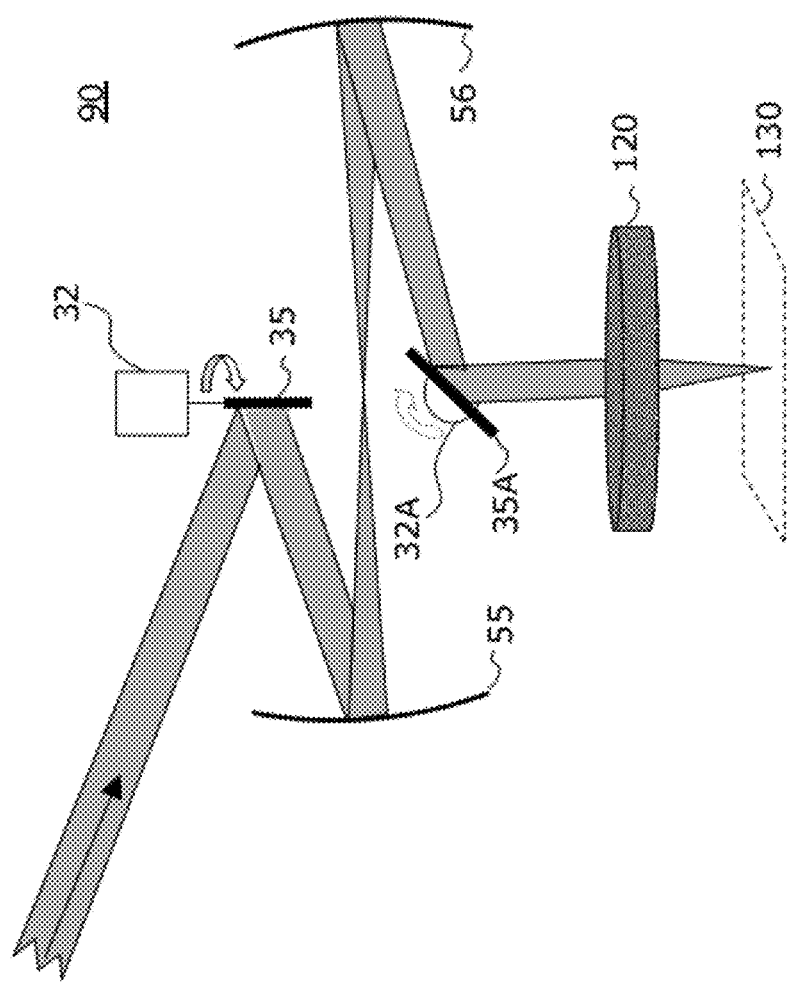
FIG. 2 is a schematic diagram of 2-D pre-objective scanning optics with first and second scanning mirrors optically co-located within the pupil of the scan lens.

The following is a detailed description of preferred, but non-limiting, embodiments of the invention, reference being made to the drawings in which the same reference numerals identify the same elements of structure in each of the several figures. It is to be understood that elements not specifically shown or described may take various forms well known to those skilled in the art. For example, conventional scanning optical systems are well known in the optical arts and are not, therefore, described in detail herein, except for those parts of systems related either directly to embodiments of the present invention or cooperating in some way with embodiments of the present invention.

Figures shown and described herein are provided in order to illustrate key principles of operation and component relationships along their respective optical paths according to the present invention and are not drawn with intent to show actual size or scale. Some exaggeration may be necessary in order to emphasize basic structural relationships or principles of operation. Some conventional components that would be needed for implementation of the described embodiments, such as various types of optical mounts, for example, are not shown in the drawings in order to simplify description of the invention itself. In the drawings and text that follow, like components are designated with like reference numerals, and similar descriptions concerning components and arrangement or interaction of components already described are omitted. Where they are used, the terms "first", "second", and so on, do not necessarily denote any ordinal or priority relation, but are simply used to more clearly distinguish one element from another. The terms "scanning" and "steering" may be used interchangeably in this document.

In the context of the present disclosure, the phrase "reflective surface" is used interchangeably with the term "mirror". As is familiar to those skilled in the optical design arts, a reflective surface can be formed from a number of different materials, including metals and from dichroic and metal coatings on various substrates, for example.

In the context of the present disclosure, the phrase "substantially circular" describes a feature or object that appears circular or nearly circular to the unaided eye of an observer.

As was noted earlier in the background section and described with reference to FIG. 3, the Offner system is not useful as a beam relay. In order to work as a relay, the respective positions of object 15 and the entrance pupil (not shown in FIG. 3 because it is at infinity) must be switched. Correspondingly, the placement of image 15A and exit pupil must also be reversed.

The present invention addresses the problems that have thus far prevented the use of Offner-type optics as beam relays. To do this, the present invention modifies the conventional Offner design with the addition of aspheric corrector optics disposed in the path of the collimated input beam. This effects the needed change in position for both entrance and exit pupils, as just described.

Figure 4:
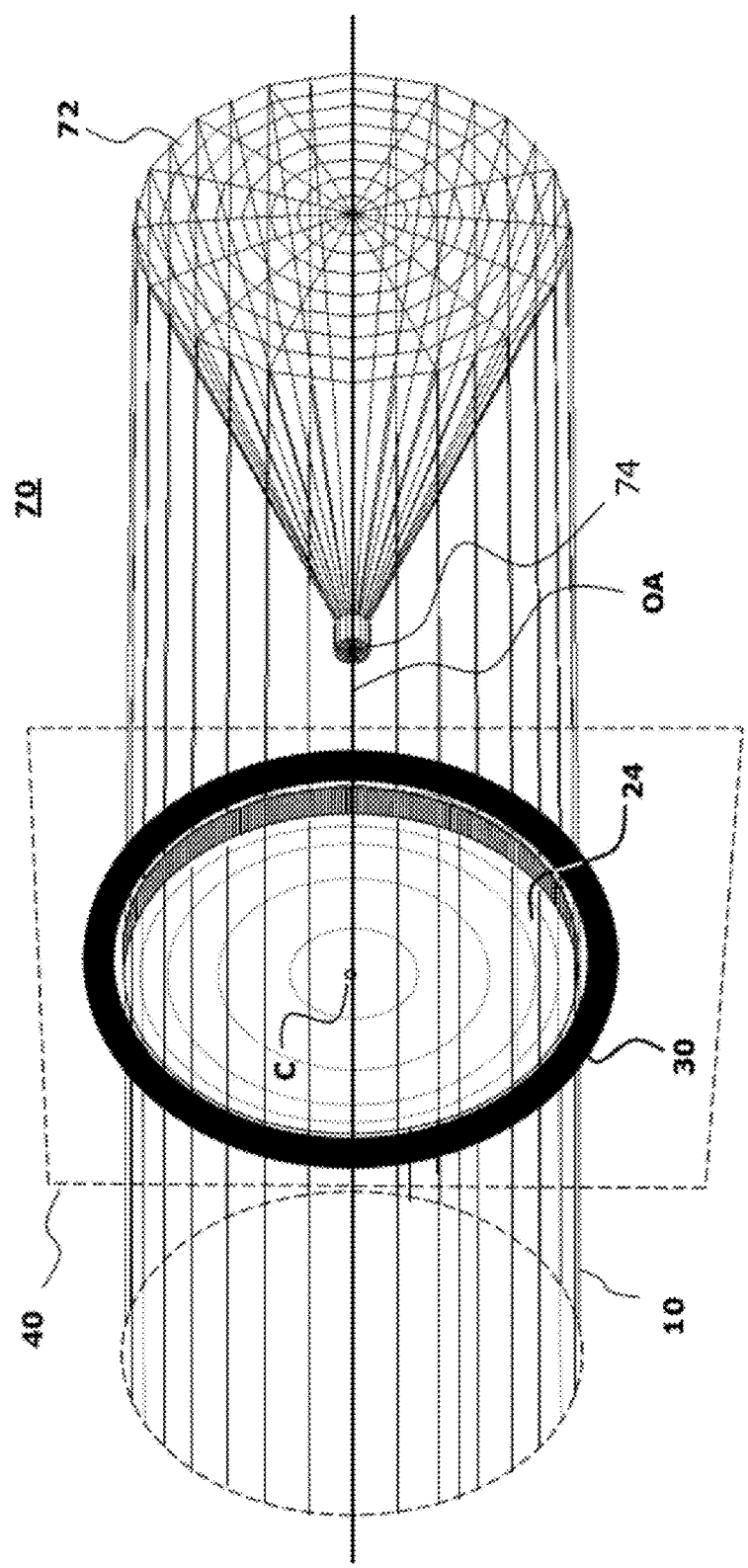
FIG. 4 is a perspective view of components in a Schmidt telescope.

Corrector optics are used to correct for image aberration in various types of telescope systems, such as a Schmidt telescope 70 shown in FIG. 4. In the catadioptric Schmidt system, a high degree of symmetry is achieved, with all components centered on optical axis OA. The object for the Schmidt telescope system is at infinity; the image is at the back focal plane of a primary spherical curved surface. An on-axis collimated beam 10 from the object field is reflected from a primary spherical mirror 72 and forms an image on a secondary spherical focal surface 74 located at the back focal plane of spherical mirror 72. Both entrance and exit pupils are at a plane 40 that is coplanar with the center of curvature C of the curved reflective surfaces and centered about C. For reference, plane 40 may be termed the "center plane". Spherical aberration in the Schmidt telescope is corrected by a thin refracting aspheric element 24 that is symmetric about the optical axis and positioned at the center of curvature C of primary spherical mirror 72. Off-axis aberrations are corrected since the system is concentric about the stop, so the off-axis beams "see" the same optical system at all angles (except for small variations due to the corrector off-axis performance).

In order to suitably adapt Offner optics to the task of pupil relay, embodiments of the present invention employ the concept of corrective optics at the stop. However, unlike the axially symmetric corrector optics used, for example, in Schmidt telescope systems, the corrector optics 20 in FIG. 5 of the present invention are disposed only near the decentered entrance pupil 30. Moreover, unlike the Schmidt corrector that corrects for the spherical aberration from a single reflection from the concave mirror, corrector optics for the present invention correct for two reflections from a concave mirror or mirrors, as shown in subsequent description. Significantly, with the addition of corrector optics 20, the phase of the beam that is being relayed is preserved. Using corrector optics, a corrector element 20 of the present invention, with the optical arrangement of FIGS. 5-8, the phase wavefront variation over the beam at the exit pupil is less than a quarter wave for a perfectly collimated input beam.

Figure 5:
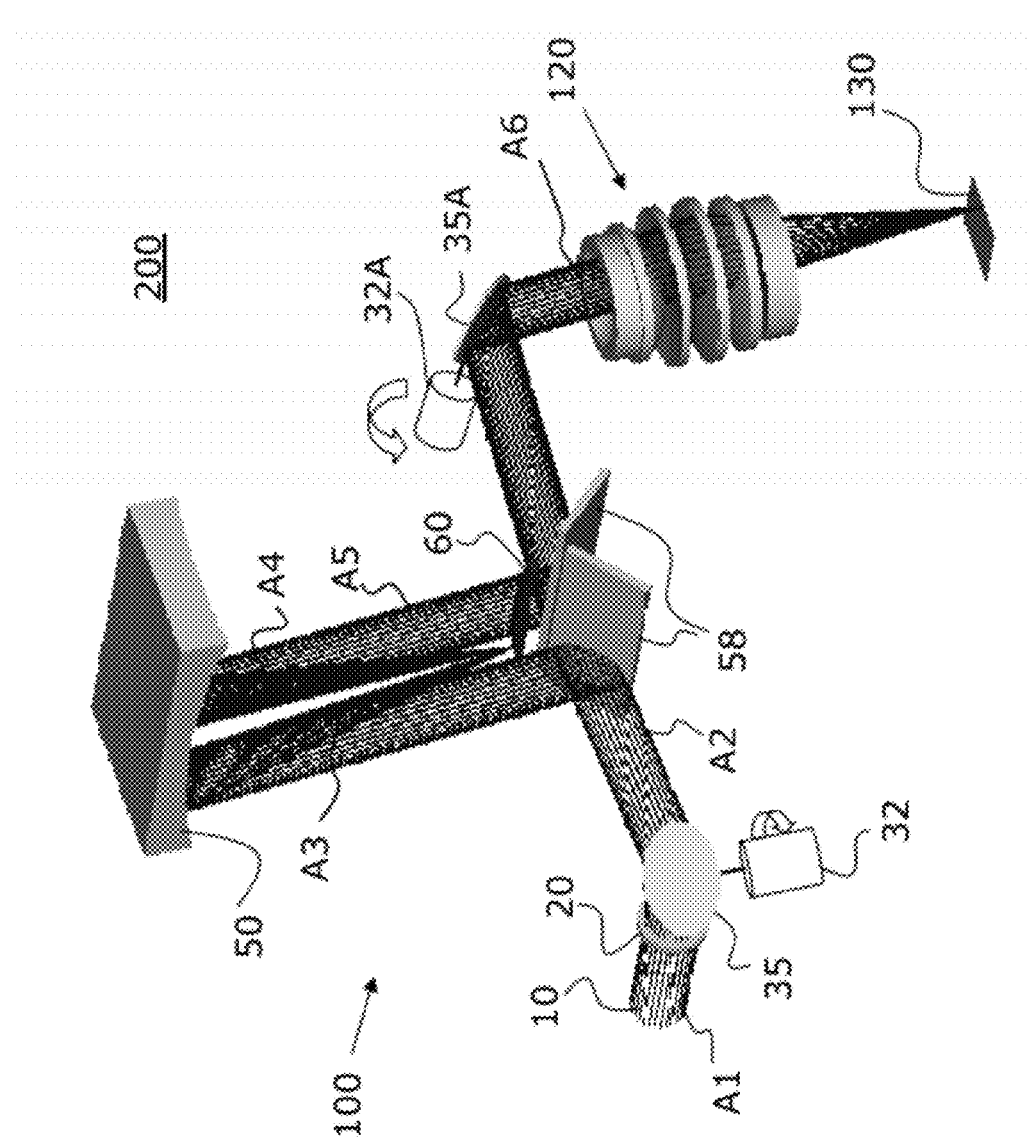
FIG. 5 is a perspective view of a beam relay according to one embodiment of the present invention.
Figure 6:
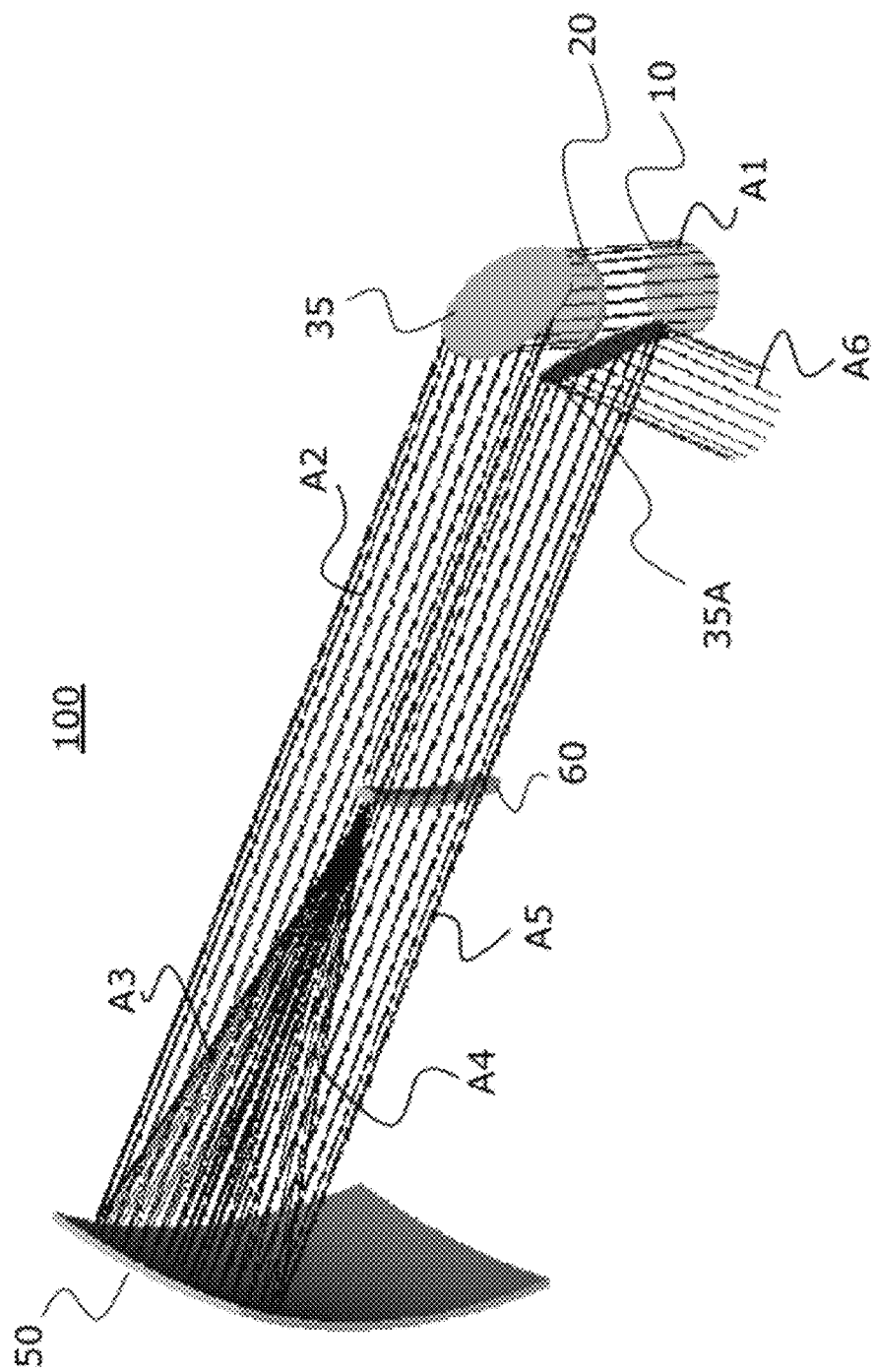
FIG. 6 is a perspective view showing a portion of the optical path for a beam relay as in FIG. 5.

Referring to FIG. 5, there is shown an embodiment of a beam relay 100 that scans coherent light as part of a pre-objective laser scanning system 200 according to the present invention. FIG. 6 gives a perspective view showing component functions in the optical path, as considered looking inward toward the curved reflective surface of primary concave mirror 50, and shown without folding mirrors 58.

Annotations A1-A6 given in FIG. 5 and following help to trace the path of light through the system of beam relay 100. Input collimated beam 10 from the laser source (not shown) at A1 is directed to first scanning mirror 35 through corrector element 20. Scanning mirror 35 reflects the light A2 to folding mirror 58 and toward primary concave mirror 50. Primary concave mirror 50 reflects this light A3 onto secondary convex mirror 60. Secondary convex mirror 60 reflects this light A4 back toward primary concave mirror 50. The reflected light A5 from primary concave mirror 50 is then directed, again as collimated light, to scanning mirror 35A. This scans the beam in the orthogonal direction to that scanned by scanning mirror 35. The scanned light A6 is then directed through scan lens 120 that focuses the two dimensionally steered beams onto a surface, such as a scanned image surface 130 to form a scanned 2-D image. Folding mirrors 58 help to reduce the spatial footprint of the system.

In the perspective view of FIG. 6, the arrangement and geometry of secondary convex mirror 60 within relay 100 are shown in more detail. As can be seen from this view, mirror 60 can be sliced to a narrow strip as is explained in more detail subsequently.

As one type of scanning element, scanning mirrors 35 and 35A are actuable devices driven by deflecting mechanisms, shown in FIG. 5 as actuators 32 and 32A, respectively. Although scanning mirrors 35 and 35A are shown as galvo (galvanometer) type scanning mirrors, it is understood that polygons, monogons, holograms and other one-dimensional beam steering devices of various types, reflective and refractive, can alternately be used as scanning elements.

Figure 7:
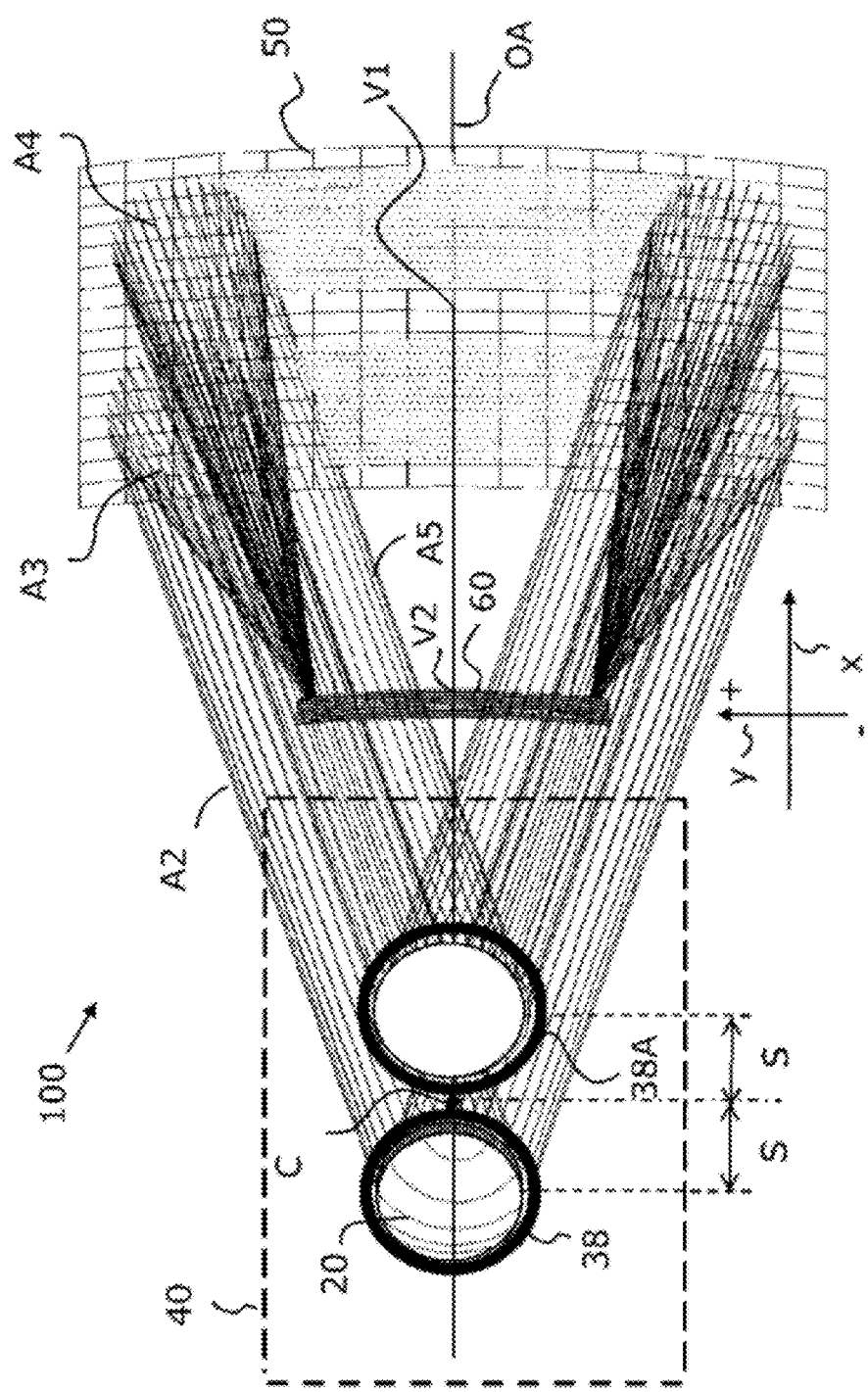
FIG. 7 is another perspective view showing entrance and exit pupil positions for the beam relay of the present invention.

FIG. 7 shows the optical behavior of beam relay 100 in FIGS. 5 and 6, from the beginning to the ending of a scanned line, from the perspective of entrance and exit pupils 38 and 38A, respectively. FIG. 7 also shows aspects of placement for optical system components. Primary concave mirror 50 has its center of curvature C and a vertex V1 that define optical axis OA. Mirrors 35 and 35A, shown in FIGS. 5 and 6 but not shown in FIG. 7 for clarity, are correspondingly placed at pupils 38 and 38A of relay 100. Pupils 38 and 38A are located on center plane 40. The center of curvature C of primary concave mirror 50 of secondary convex mirror 60 is substantially coplanar with pupils 38 and 38A at center plane 40. With respect to such distance relationship, the term "substantially" can be taken to mean "within about +/−2%". For example, if the radius of curvature of mirror 50 is 100 mm, for example, the center of curvature C is within about +/−2% of that distance from plane 40, that is, within about +/−2 mm of plane 40. Convex mirror 60 is located substantially half way (again, within about +/−2% of the actual half distance) between plane 40 and concave mirror 50, as shown in FIG. 7, with its center of curvature substantially coincident with center of curvature C of concave mirror 50, located substantially at plane 40. Thus the radius of curvature of concave mirror 60 is substantially half that of convex mirror 50. Mirror 60 has a vertex V2 along optical axis OA. This is a basic structural relationship that parallels the Offner system of FIG. 3. However, the changes described herein are required in order to take advantage of aspects of the Offner design and adapt it to the challenge of beam relay operation including beam phase preservation, for which it was not originally intended and which the Offner system is incapable of providing. In the view of FIG. 7, the beginning of the scanned line directs light toward the top of primary concave mirror 50. The scan in this first direction, providing the light labeled A2, then proceeds downward along mirror 50 (the −y direction in FIG. 7). The light at A4 that is reflected back onto primary concave mirror 50 from secondary convex mirror 60 moves in a parallel path to the A2 light, also proceeding downward along mirror 50 as the line scan progresses.

It is understood that while FIG. 7 shows the pupils 38 and 38A and corrector 20 as having circular apertures, they could alternately have other shapes, including non-circular pupil shapes such as square and rectangular; input beam 10 could also have a non-circular cross section.

Figure 8:
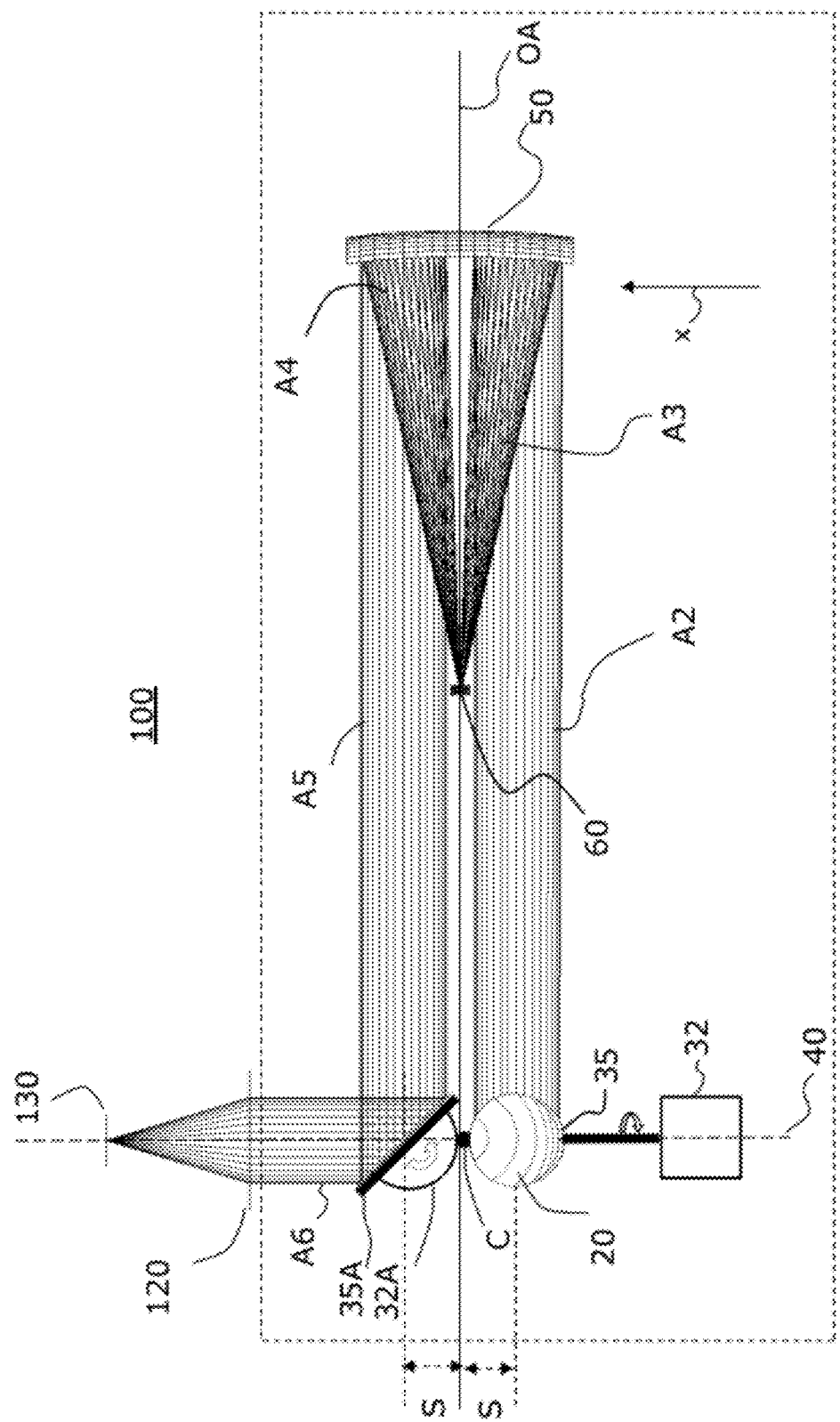
FIG. 8 is a top view, optically unfolded, of the beam relay of FIGS. 5-7.

FIG. 8 shows a top view of beam relay 100, optically unfolded with respect to FIG. 5. Annotation A2-A6 again traces the light path, beginning from after aspheric corrector element 20 to scanning the 2-D image at image surface 130.

In beam relay 100, substantially collimated input beam 10 is incident on aspheric corrector element 20, near the entrance pupil. Aspheric corrector element 20 is an off-center segment, with circular-aperture, having correction values centered on the center of curvature C as shown in FIG. 7. Corrector element 20 as described is a transmissive corrector, such as an aspheric lens element. However, in an alternative embodiment corrector element 20 can also be designed as an aspherical doublet using two elements with different dispersions or the corrector can be a reflective corrector, thus providing improved aspheric correction performance over a larger spectral range. A short distance following corrector element 20 (as shown more clearly in the perspective view of FIG. 5), the beam is deflected in the y direction by scanning mirror 35.

As mentioned earlier and shown from various perspectives in FIGS. 5-8, convex mirror 60 can be in the form of a narrow strip, wherein the width of its reflective surface is less than its length. This makes it possible to minimize the decenter distance S, shown in FIG. 7. As is best seen in the views of FIGS. 7 and 8, the beam is steered along primary concave mirror 50 in the y direction during scan operation; there is no beam displacement in the x direction within beam relay 100. Thus, mirror 60 can be narrowed in the x direction with no impact on the system performance, thereby reducing separation distance S. If mirror 60 were wider in the x direction, however, this would necessitate an increased separation S that would be otherwise needed to avoid interference of mirror 60 with the incoming and outgoing beams A2 and A5. In contrast to this arrangement, it can be observed that conventional Offner system optics, as shown in FIG. 3, require that convex mirror 60 have a circular aperture. Then, to avoid interference between mirror 60 and the beams in the conventional Offner system, the decentering distance S actually needs to be larger than the semi-diameter of mirror 60. Notably, high order aberrations in the conventional Offner system increase with increased separation distance S. To some extent, reduced performance can be corrected by scaling up the radii of curvatures of mirrors 50 and 60 and the corresponding axial distances. However, this has the disappointing result of increasing system dimensions.

The table of FIG. 9 shows a design example for beam relay 100 in one embodiment using terms used in the widely used Zemax optical design program (ZEMAX Development Corp., Bellevue, Wash.). A number of notes and observations apply for this and other exemplary embodiments:

(i) The entrance and exit pupils are spaced apart and in a plane 40 which is 160 mm from the vertex of mirror 50.
(ii) The off-axis decentering distance S of the pupils from the optical axis is 10 mm.
(iii) The diameter of entrance pupil 30 is 15 mm, and the beams are deflected by scanning mirror 35, as shown on FIG. 5, by a total optical scan angle of 20 degrees.
(iv) Primary concave mirror 50 can be shortened widthwise, as shown in FIG. 7. In this example embodiment, primary concave mirror 50 is reduced to a width of 76 mm in the y scan direction and to about 40 mm in the x or cross scan direction.
(v) Convex mirror 60, as shown on FIG. 7, is reduced to a width of 3.2 mm in the y scan direction by about 32 mm in the x or cross scan direction.
(vi) Silica aspheric corrector element 20 in this example, best shown in FIG. 7, is disposed at the entrance pupil.

Note that in FIG. 5, aspheric corrector element 20 is shown displaced along the input beam 10 from scanning mirror 35, which is at entrance pupil 30, so that it does not interfere with the scanning operation. This slight displacement has minimal affect on the performance of corrector 20 since input beam 10 is collimated, axial, and stationary.

The performance of the optical system described with respect to FIGS. 5-9, over the visible spectrum, is diffraction limited. Variability of the RMS wavefront is less than 0.05 waves. The OPD peak-to-peak is less than 0.25 waves and the Strehl Ratio is above 0.9. For green light only, at 586 nm, the Strehl Ratio is over 0.95 and the RMS wavefront is less than 0.025 waves.

As suggested in the illustrations of FIGS. 7 and 8, entrance pupil 38 and aspheric corrector element 20 are significantly decentered by a distance S from optical axis OA. Unlike the corrector used in Schmidt telescopes and corrective optics for similar concentric optical systems, the aspheric corrector 20 of the present invention is an off-center segment with an aspheric term that is about twice the value that is used for Schmidt and other single mirror systems. Note that aspheric corrector element 20 is depicted on FIGS. 7 and 8 with dotted lines centered on the optical axis OA and the center of curvature C to indicate that this is a decentered circular-aperture element that is segmented from or cut from a larger, axially symmetrical element. Aspheric corrector element 20 is described in the examples given herein as a transmissive (refractive) component. However, reflective optics could also be provided, and could provide improved aspheric correction performance over larger spectral range.

The concave mirror is shown in FIG. 9 with a spherical surface. It is possible to keep the axial symmetry of the system, but change the concave mirror to a torodial shape, such as having a parabolic cross section in the x direction. A mirror of this type is corrected for spherical aberration in this direction; thus, if this were used, the aspheric corrector must then correct only in the y direction (that is, the scan direction). Such an arrangement of corrector and concave mirror would be functional, but the system would be more costly to construct and more complex to align.

Scan lens 120 is also known as an f-theta lens, a focusing lens, or an objective lens. This is shown schematically in FIGS. 5 and 8 and can comprise either or both refractive and reflective components.

When compared against the conventional Offner optical system that has some similar components and spacing relationships, beam relay 100 effectively interchanges the relationships of object/image planes and pupil planes. Thus, for example, in FIG. 7, the incoming beam at aspheric corrector element 20, or entrance pupil 38, is collimated at plane 40 and is directed to primary concave mirror 50 as collimated beam A2. Equivalently stated, the object point is at infinity. This runs counter to Offner optics, for which the input beam is focused at plane 40, as was shown in FIG. 3.

Figure 3:
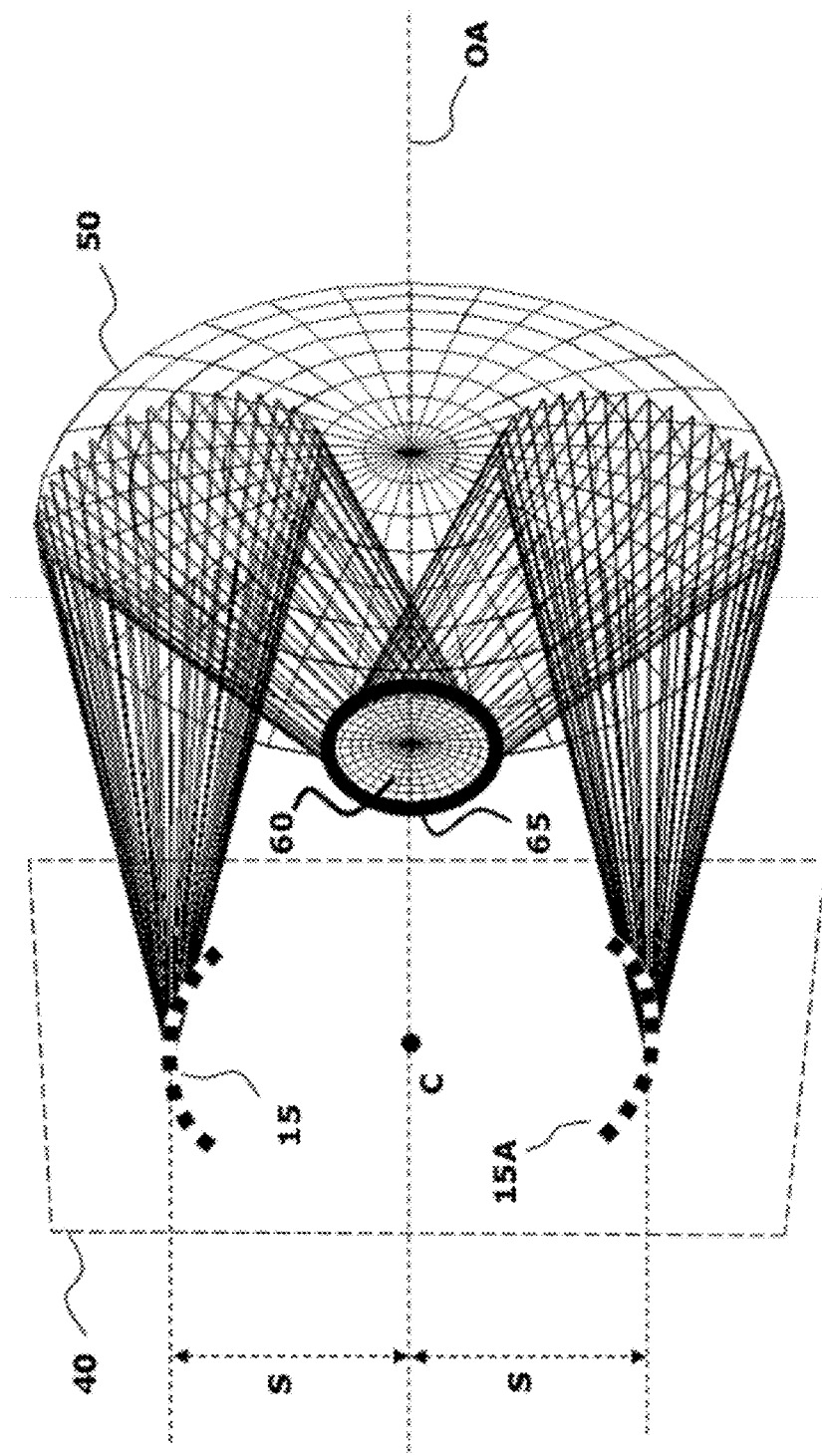
FIG. 3 is a perspective view of components and light paths for an Offner scanning system.

It should be observed that simply adding a corrector element at plane 40 of a conventional Offner optical system, as shown in FIG. 3, does not affect various aspects of Offner system performance, because the marginal ray height at this position is zero, since this is its object plane. While corrective optics may have been previously applied to Offner systems for various reasons, such as the use of shell like correctors interposed between plane 40 and concave mirror 50, and displaced along the optical axis from plane 40, as described in U.S. Pat. No. 4,693,569 to Offner, these have been used to correct for high order field aberrations such as fifth order astigmatism, not to adapt Offner imaging for beam relay use.

As was noted earlier with respect to FIG. 3, conventional Offner optics provide a thin arcuate object field, not adaptable for use as a beam relay. The convex secondary mirror of the conventional Offner arrangement is at the pupil of such a system and commonly has a circular aperture.

Figure 10:
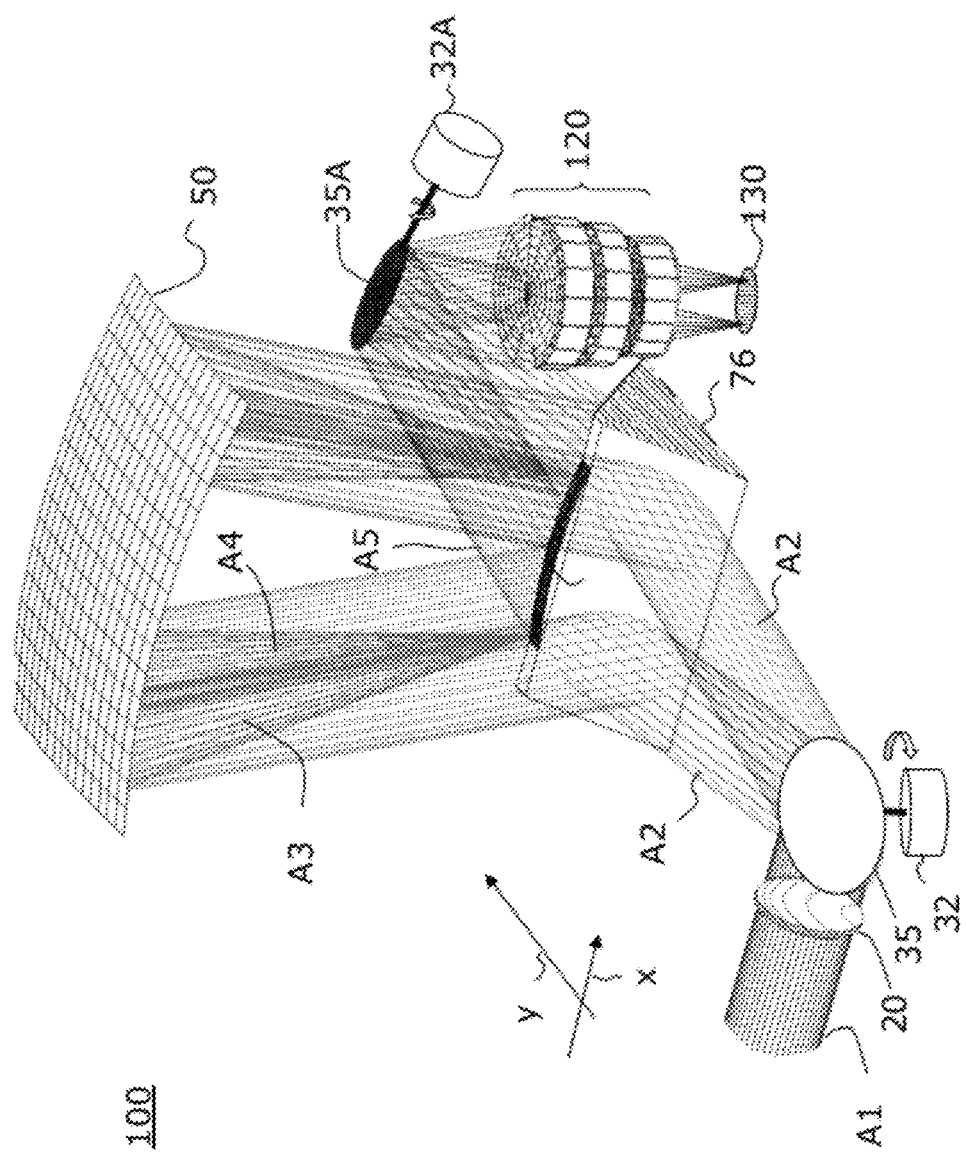
FIG. 10 is a perspective view showing an alternate embodiment of a beam scanner using a prism for light redirection.

The perspective view of FIG. 10 shows an alternate embodiment of beam relay 100 within a scanning apparatus in which a prism 76 is used to fold the optical path and also provides a mounting position for secondary convex mirror 60.

Figure 11:
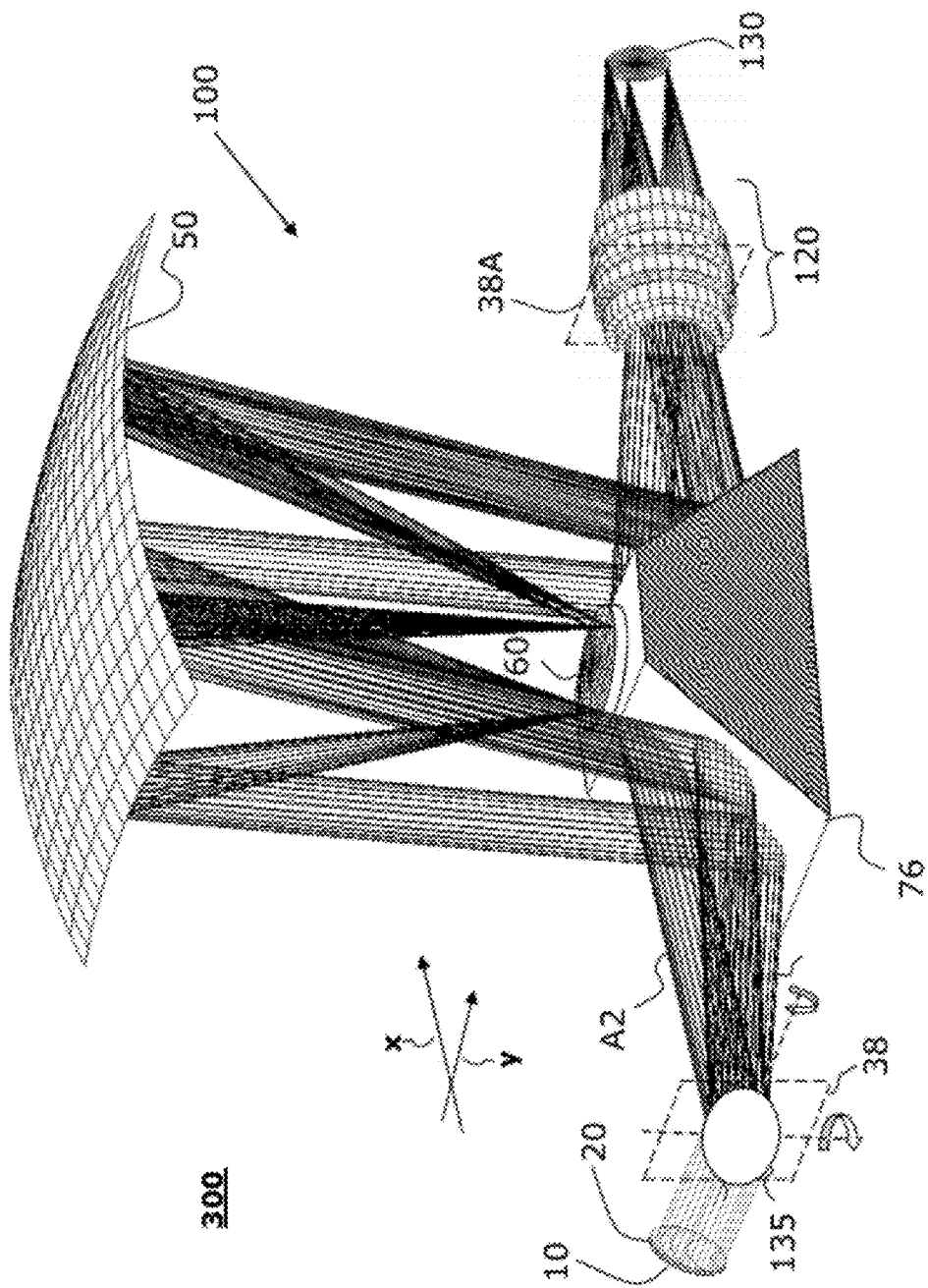
FIG. 11 is a perspective view showing an alternate embodiment of a beam scanning that has a two-axis deflection device.

While beam relay 100 of the present invention is particularly well suited for systems that provide separate x- and y-axis scanners, such as those described with reference to FIGS. 5-10, embodiments of the present invention can also be used with two-axis deflection provided by a single gimballed mirror or other device. The perspective view of FIG. 11 shows a pre-objective laser scanning system 300 having a two-axis deflector 135, a two dimensional scanning element that scans the beam in both the x and y directions. Two-axis deflector 135 could be a gimbaled mirror capable of deflection in two orthogonal directions and able to reach the internal stop of a scanning lens. While most scanning lenses have an accessible external entrance pupil, some, especially those with high numerical aperture, may have an internal inaccessible entrance pupil. With the FIG. 11 arrangement, the entrance pupil of scan lens 120 is placed at exit pupil 38A of beam relay 100. The scan lens in this case can have an internal entrance pupil, shown at 38A, as opposed to the common external entrance pupil of other arrangements. This is conducive to increased performance and reduced cost of the scan lens.

Beam relay 100, having an accessible external exit pupil, can be used with such a scan lens. When using the arrangement of FIG. 11 for a 2 dimensional scan, secondary convex mirror 60 has a circular aperture as opposed to the thin sliced convex mirror 60 shown earlier with respect to FIGS. 5-8. In order for the beams to clear this enlarged convex mirror 60, the pupil separation distance S of FIGS. 7 and 8 must be increased (for example, from 10 mm to 24 mm). Over scan angles of 12 degrees in both x and y directions, and beam size of 6 mm, the performance of the system of FIG. 11 is diffraction limited over the visible spectrum.

As noted earlier, various types of scanning elements can be used to provide the function of scanning mirrors 35 and 35A in embodiments of the present invention. In addition to galvo mirrors, MEMS (Micro-ElectroMechanical Systems) beam deflectors can alternately be used as scanning elements. MEMS deflectors have been used, for example, with laser mini- and pico-projectors, such as the "PicoP" projector made by Microvision, Inc., Redmond, Wash. The PicoP projector uses a gimbaled TABS MEMS mirror. In one direction, the scan is performed by a small mirror that is scanned at high speed. This small mirror is mounted on a gimbal that is larger and scans the beam in the orthogonal direction at a much reduced speed. While this arrangement is workable, however, there can be inherent problems with distortion associated with gimbaled mirrors.

According to an embodiment of the present invention, gimbaled mirrors are not used. Instead, light from the afocal beam relay of the present invention is scanned using a pair of one-dimensional MEMS deflectors. Exemplary MEMS deflectors for this purpose include MEMS devices made by Lenoptix SA, Lausanne, Switzerland, or by Mezmeriz, Rochester, N.Y.

Figure 12:
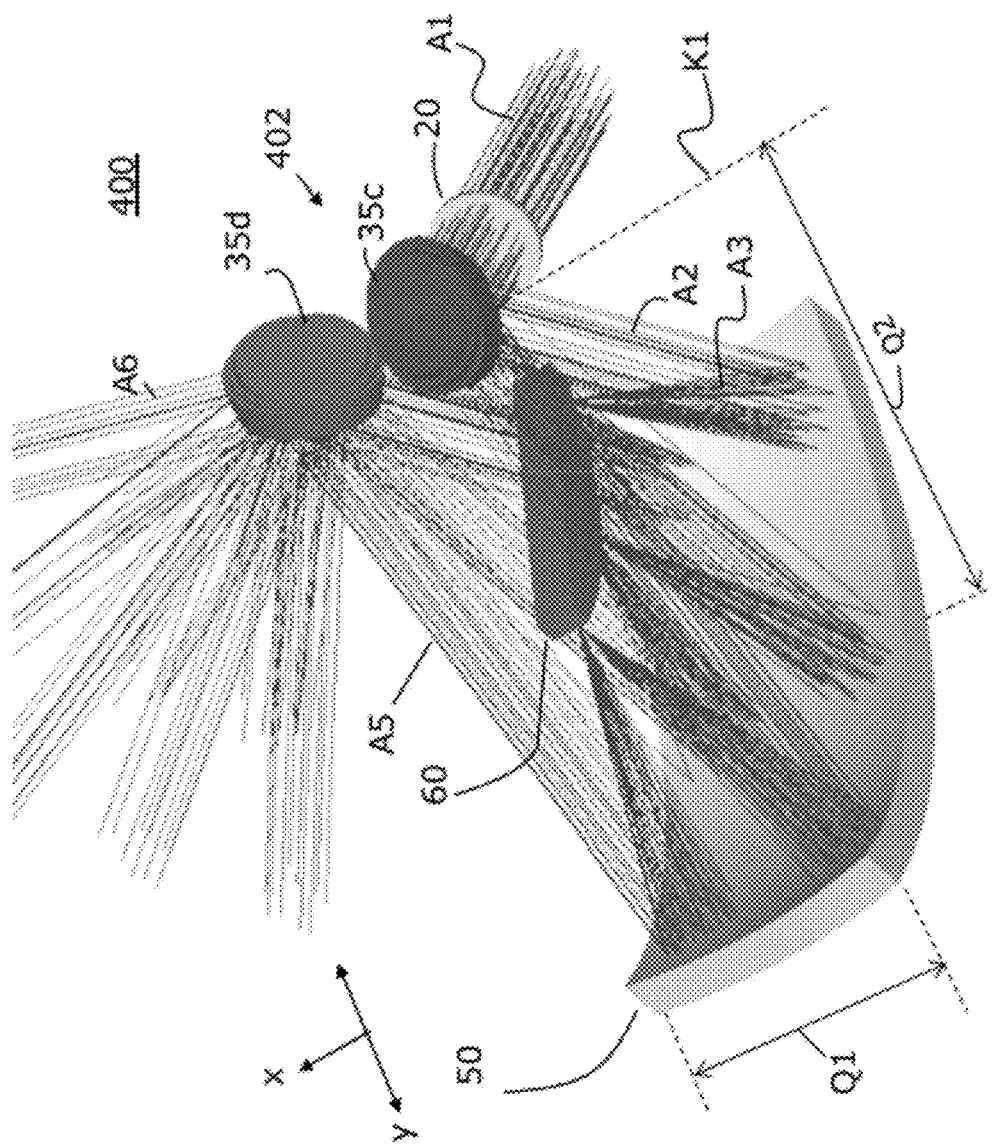
FIG. 12 is a perspective view showing an alternate application of the relay in a mini laser projector using MEMS beam deflectors.

The perspective diagram of FIG. 12 shows a laser scanning system 400 with a beam relay 402 that uses two MEMS deflectors as scanning elements, shown as deflectors 35c and 35d. By comparison with system 100 of FIG. 10, galvo mirrors 35 and 35a are replaced by one-dimensional microelectromechanical scanning elements, the MEMS deflectors 35c and 35d. Reflective deflector 35c scans in the y direction; reflective deflector 35d scans in the x direction. This allows system 400 to be scaled significantly in size, to dimensions suitable for laser mini-projectors and similar devices. For example, width dimension Q1 can be in the 6.4 mm range. Distance dimension Q2 from the axis of symmetry K1 of the optical system can be in the 15 mm range. Advantageously, by adjusting the distance between mirrors 50 and 60, relay 402 can provide a focused image onto the image surface at a distance, with no scan lens being used. The image surface is not shown in FIG. 12.

Figure 13A:
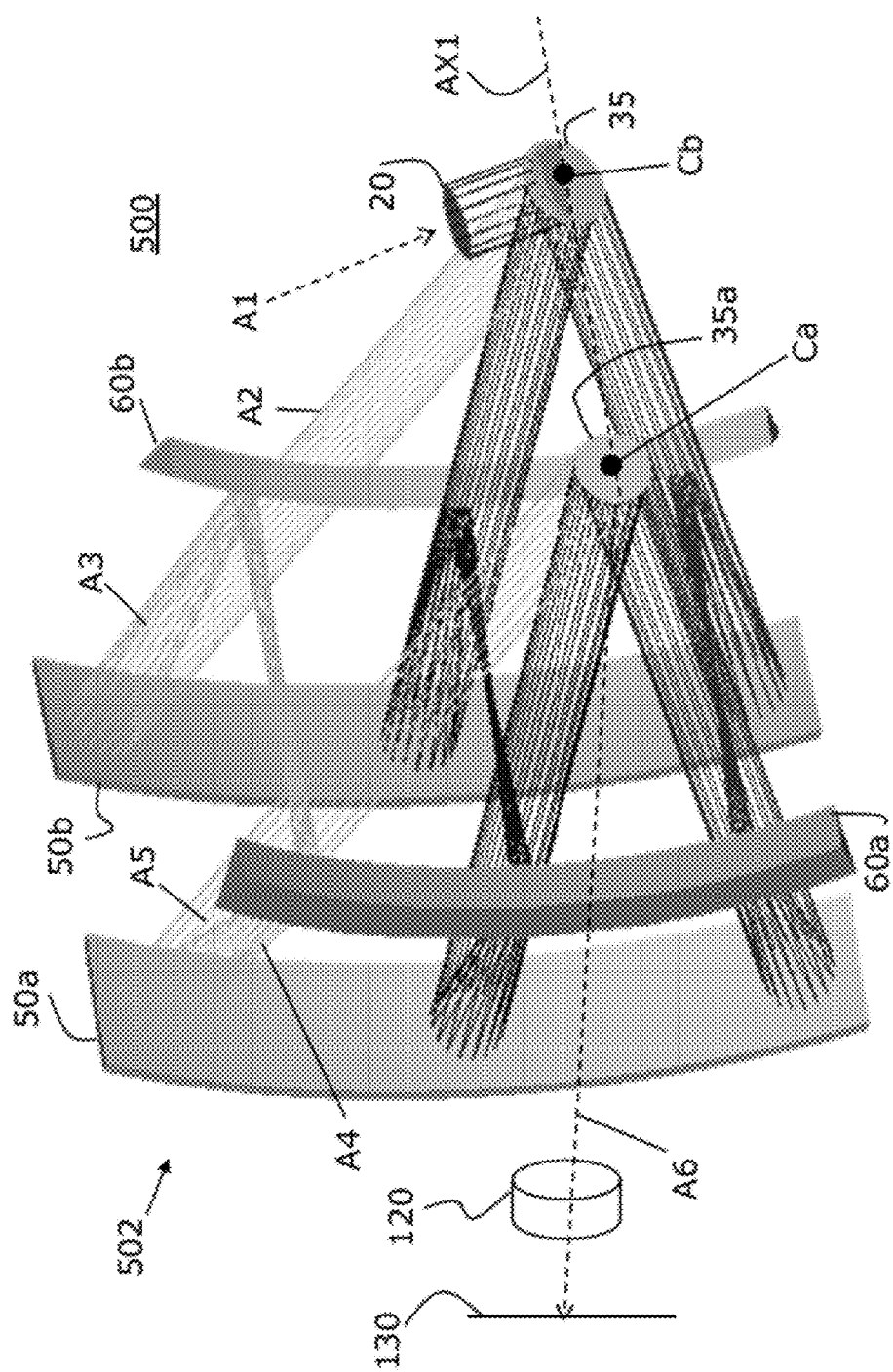
FIG. 13A is a perspective view that shows a modified relay for applications with high power lasers where the beam is not focused on the secondary mirror.
Figure 13B:
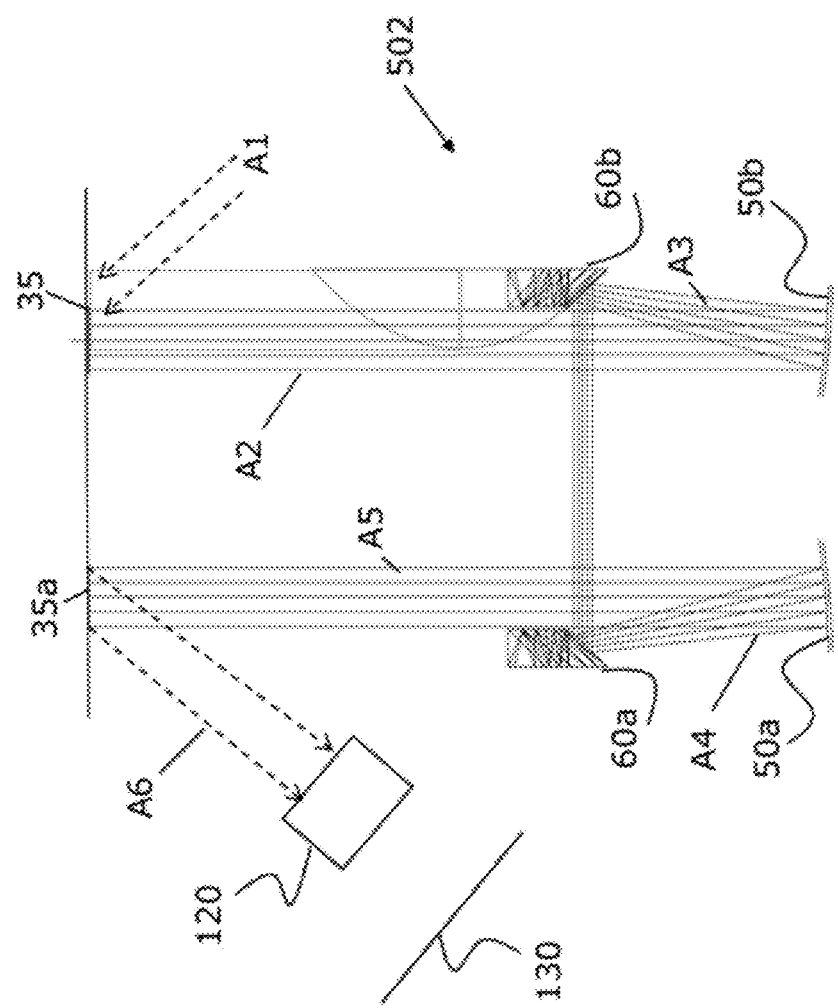
FIG. 13B is a top view showing a portion of the light paths for the FIG. 13A embodiment.

FIGS. 13A and 13B show an alternate embodiment of a laser scanning system 500 with a beam relay 502 having aspheric corrector element 20 for relaying a decentered entrance pupil to a decentered exit pupil that addresses a problem related to high power laser light, such as might be used in a writing application. At high laser power levels, there is potential for damaging the surface of the convex secondary mirror with a focused beam. Alternatives such as cooling the secondary mirror or rotating the mirror about its center of curvature can be used to mitigate high exposure levels; however, these methods require additional components and mechanical complexity. In the FIGS. 13A and 13B embodiment, the concave primary mirror is divided into two toroidal primary mirrors 50a and 50b, both having the same curvature, monocentric about an axis AX1 connecting scanning mirrors 35 and 35a. The corresponding centers of curvature Ca and Cb lie on axis AX1. Convex secondary mirrors 60a and 60b provide a toroidal surface with a hyperbolic cross section in the plane, as best shown on FIG. 13B. Secondary mirrors 60a and 60b are monocentric with axis AX1 connecting scanning mirrors 35 to 35a. Centers of curvature Ca and Cb for secondary mirrors 60a and 60b correspond to those of the primary reflective surfaces 50a and 50b, respectively. The incoming beam of light at A1, incident on scanning mirror 35 at the entrance pupil and reflected at A2 from primary concave mirror 50b is reflected as A3 from secondary mirror 60b and, considered from a top view, is collimated between mirrors 60a and 60b, as shown in the plan view of FIG. 13B. Seen from the orthogonal direction, however, as is best shown in the perspective view of FIG. 13A, the beam of light comes to focus in mid air, that is, within a region that lies half way between the mirrors 60a and 60b. There is, then, no focus of the beam directly on any mirror surface. This light, reflected from mirror 60a, then proceeds at A4 to primary concave mirror 50a and is reflected from mirror 50a as A5 and, from there, is reflected as A6 to scan lens 120 and to the image surface 130. FIG. 13A shows the scanned light at different scanned positions. According to an alternate embodiment of the present invention, one or more of the primary and secondary mirrors 50a, 50b, 60a, and 60b are non-spherical. Using the embodiment of FIGS. 13A and 13B, the phase wavefront variation over the beam at the exit pupil is less than a quarter wave for a perfectly collimated input beam. Entrance and exit pupils at mirrors 35 and 35a may be circular or non-circular.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, dimensional values shown are given by way of example; other dimensions could be used, depending on various factors such as beam width, scan angles, and wavelengths. While the apparatus and methods described are particularly well suited to laser light, the apparatus of the present invention can also be used with other collimated light sources. The optical path can be folded using turning mirrors or similar devices in order to allow more compact packaging for optically equivalent arrangements, for example. Using folding, entrance and exit pupils can be optically coplanar, for example, without being geometrically disposed within the same plane. Convex and concave reflective surfaces can be spherical or non-spherical, as has been described.

Thus, what is provided is an apparatus and method for providing a beam relay for a scanning system.

PARTS LIST

10. Collimated beam
15. Object

15A. Image
20. Aspheric corrector element
24. Corrector element
30. Stop
32, 32A. Actuator
35, 35A. Scanning mirror
35c, 35d. Deflector
38, 38A. Pupil
40. Center plane
50. Primary concave mirror
50a and 50b. Concave toroidal primary mirrors
55, 56. Mirror
58. Folding mirror
60. Secondary convex mirror
60a and 60b. Convex toroidal secondary mirrors
65. Exit pupil
70. Schmidt telescope
72. Spherical mirror
74 Focal surface
76. Prism
80. Pre-objective scanning system
82. Light beam
90. Optical relay
92. Offner optical system
100. Beam relay
120. Scan lens
130. Image surface
135. Two-axis deflector
200. Laser scanning system
300. Laser scanning system
400. Laser scanning system
402. Beam relay
500. Laser scanning system
502. Beam relay
OA. Optical axis
A1, A2, A3, A4, A5, A6. Annotation
AX1. Axis
B. Beam width
Ca, Cb. Center of curvature
L, S. Distance
K1. Axis of symmetry
Q1, Q2. Dimension
V1, V2. Vertex
α Angle

The invention claimed is:

1. An afocal beam relay comprising:
   first and second primary concave reflective surfaces and first and second secondary convex toroidal reflective surfaces,
   wherein the centers of curvature of each of the first and second primary reflective surfaces and first and second secondary reflective surfaces lie on an axis;
   wherein the first and second secondary convex reflective surfaces face toward the first and second primary concave reflective surfaces and are disposed to relay a decentered entrance pupil to a decentered exit pupil; and
   an aspheric corrector element that is disposed in the path of an input beam of light that is directed by the primary and secondary surfaces to the decentered entrance pupil,
   wherein the directed beam of light between the first and second secondary convex mirrors is collimated in one direction and focused in mid air in an orthogonal direction.

2. The afocal beam relay of claim 1 wherein the aspheric corrector element is a lens.

3. The afocal beam relay of claim 1 wherein the aspheric corrector element comprises one or more reflective surfaces.

4. The afocal beam relay of claim 1 wherein the first and second primary concave reflective surfaces are non-spherical.

5. The afocal beam relay of claim 1 wherein the first and second secondary convex reflective surfaces are non-spherical.

6. The afocal beam relay of claim 1 wherein the entrance and exit pupils are substantially circular in shape.

7. The afocal beam relay of claim 1 wherein the entrance and exit pupils are non-circular in shape.

8. The afocal beam relay of claim 1 further comprising:
   a first scanning element actuable to scan the input light at the entrance pupil in a first direction;
   a second scanning element that is actuable to scan the relayed input light in a second direction that is substantially orthogonal to the first direction; and
   a scan lens disposed to direct the scanned light from the exit pupil toward a surface.

9. The afocal beam relay of claim 8 wherein at least one of the first and second scanning elements is a micro-electromechanical systems device.

10. A pre-objective scanning apparatus comprising:
    an afocal beam relay comprising:
    first and second primary concave reflective surfaces and first and second secondary convex toroidal reflective surfaces,
    wherein the centers of curvature of each of the first and second primary surfaces and first and second secondary surfaces lie on an axis;
    wherein the first and second secondary convex reflective surfaces face toward the first and second primary concave reflective surfaces, disposed to relay a decentered entrance pupil to a decentered exit pupil; and
    an aspheric corrector element that is disposed in the path of an input beam of light that is directed by the primary and secondary surfaces to the decentered entrance pupil,
    wherein the directed beam of light between the first and second secondary convex mirrors is collimated in one direction and focused in mid air between the first and second secondary surfaces in an orthogonal direction;
    a first scanning element that is actuable to scan the input light at the entrance pupil in a first direction;
    a second scanning element that is disposed near the exit pupil and that is actuable to scan the relayed input light in a second direction orthogonal to the first direction; and
    a scan lens that is disposed to direct light from the exit pupil toward a surface.

11. The pre-objective scanning apparatus of claim 10 wherein the entrance and exit pupils are optically coplanar.

12. The pre-objective scanning apparatus of claim 10 wherein at least one of the first and second scanning elements is a micro-electromechanical systems device.

13. A method for scanning an image surface comprising:
    relaying an entrance pupil to an exit pupil by:
    providing an afocal beam relay that has first and second primary concave reflective surfaces and first and second secondary convex toroidal reflective surfaces,
    wherein the centers of curvature of each of the first and second primary reflective surfaces and first and second secondary reflective surfaces lie on an axis;
    wherein the first and second secondary convex reflective surfaces face toward the first and second primary concave reflective surfaces and are disposed to relay a decentered entrance pupil to a decentered exit pupil;
    wherein the afocal beam relay further has an aspheric corrector element that is disposed in the path of an input beam of light that is directed by the primary and secondary surfaces to the decentered entrance pupil, wherein the directed beam of light between the first and second secondary convex mirrors is collimated in one direction and focused in mid air in an orthogonal direction;

directing a collimated input beam to the entrance pupil;

scanning, at the entrance pupil, a first scanning element in a first direction; and scanning, at the exit pupil, a second scanning element that directs light in a second direction that is orthogonal to the first direction.

14. The method of claim 13 wherein the phase wavefront variation over the beam at the exit pupil is less than a quarter wave for the collimated input beam.

15. A pre-objective scanning apparatus comprising:

an afocal beam relay comprising:
(i) a concave reflective surface having a first center of curvature;
(ii) a convex reflective surface having a second center of curvature that is substantially coincident with the first center of curvature;

wherein the convex reflective surface faces toward the concave reflective surface to relay an entrance pupil to an exit pupil;

(iii) an aspheric corrector element that is disposed in the path of input light at the entrance pupil and that has correction values substantially centered on the first center of curvature;

a first micro-electromechanical systems scanning element that is actuable to scan the input light at the entrance pupil in a first direction;

a second micro-electromechanical systems scanning element that is disposed at the exit pupil and that is actuable to scan the relayed input light in a second direction orthogonal to the first direction; and a scan lens that is disposed to direct light from the exit pupil toward a surface.

* * * * *